United States Patent [19]

Stafford

[11] 4,214,734

[45] Jul. 29, 1980

[54] FENCE SYSTEM

[76] Inventor: Robert T. Stafford, 5112 Forest Ave., Downers Grove, Ill. 60515

[21] Appl. No.: 930,986

[22] Filed: Aug. 4, 1978

Related U.S. Application Data

[62] Division of Ser. No. 807,384, Jun. 17, 1977, abandoned.

[51] Int. Cl.² .................................... E04H 17/00
[52] U.S. Cl. .................................... 256/24; 256/65; 403/199
[58] Field of Search .............. 256/24, 25, 65, 66, 256/67, 68, 69; 403/187, 199, 262

[56] References Cited

U.S. PATENT DOCUMENTS

| 3,276,802 | 10/1966 | O'Brien | 403/262 X |
|---|---|---|---|
| 3,395,489 | 8/1968 | Banse | 256/24 X |
| 3,454,262 | 7/1969 | Romano | 256/24 X |
| 3,556,569 | 1/1971 | Brahn | 403/262 |
| 3,756,567 | 9/1973 | Murdock | 403/262 X |
| 3,942,763 | 3/1976 | Helterbrand | 256/65 X |

Primary Examiner—Andrew V. Kundrat
Attorney, Agent, or Firm—Neuman, Williams, Anderson & Olson

[57] ABSTRACT

A privacy fence construction is disclosed in which permanency, rigidity, adjustability of components, and flexibility of design are incorporated in a construction combining steel elements. The elements include a fence rail which is adjustable in length, a fence louver panel incorporating nested inner and outer face panels and an anchoring connection to the fence rail. The configuration of the rail permits a variety of textures and ornamental orientation of parts within each fence section.

6 Claims, 15 Drawing Figures

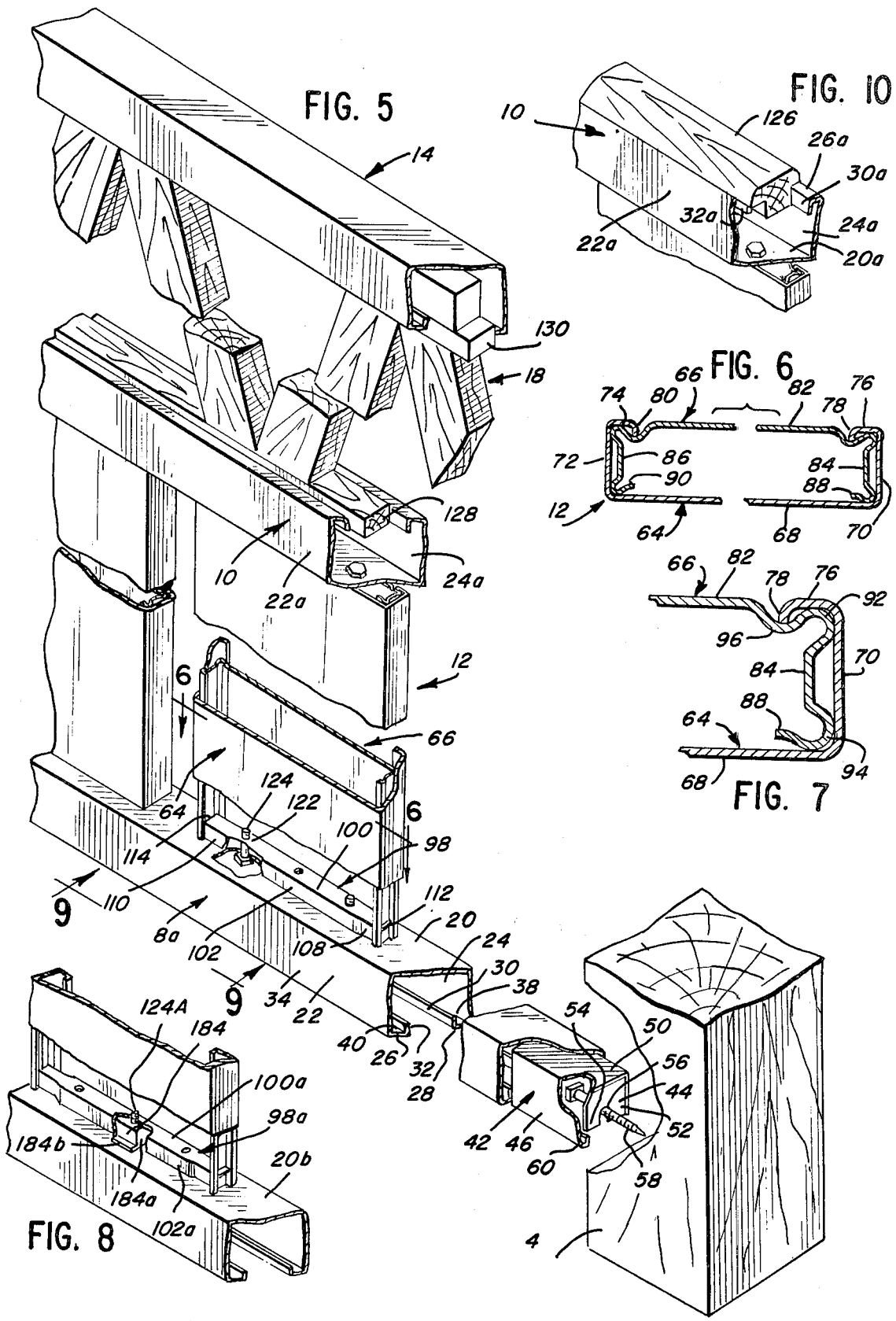

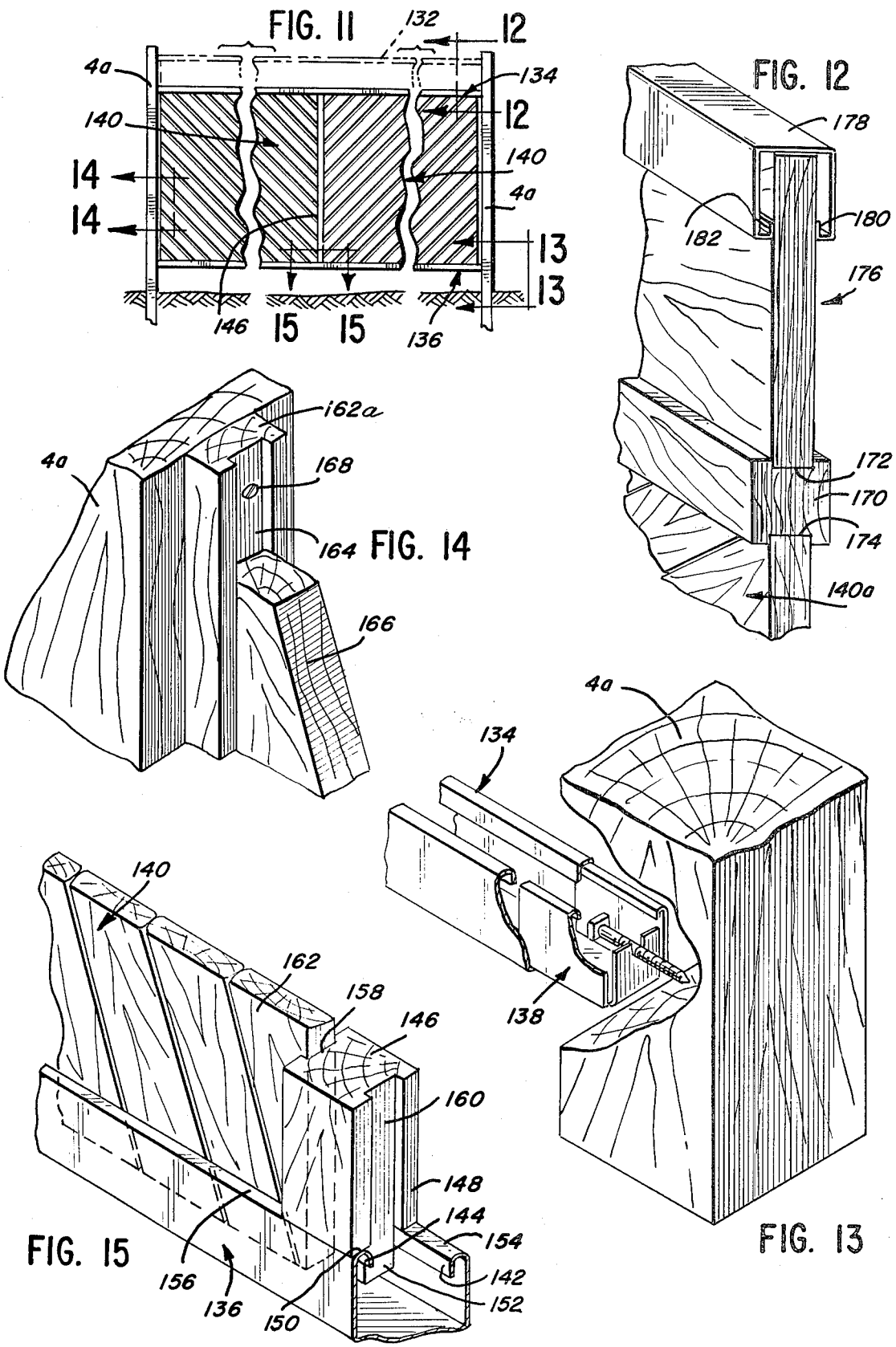

FENCE SYSTEM

This is a division of application Ser. No. 807,384 filed June 17, 1977, now abandoned.

This invention relates to the construction of a privacy fence system in which fence rails are suspended between adjacent posts of a fence, and decorative fence panels are attached to the rails. More especially, it relates to novel fence sections which include fence rails which are adjustable in length, and to fence panels which may be readily disposed and fixed at various angles to each other between the fence rails.

Fence systems of the type presently involved are normally formed of wood, or a combination of wood and metal. Such structures have embodied a variety of wooden and metal posts, wooden and metal rails, wooden panels affixed to the rails, and sometimes combinations of wood and metal within the same fence post or section. A variety of means for attaching the fence sections to the posts have been disclosed, as for example, in U.S. Pat. No. 3,799,506 issued Mar. 26, 1974 to Gerald L. Schwartz, U.S. Pat. No. 3,342,458 issued Sept. 19, 1967 to J. C. Simonton, U.S. Pat. No. 2,789,792 issued Apr. 23, 1957 to B. F. Davis, U.S. Pat. No. 3,698,692 issued Oct. 17, 1972 to Clinton A. Burrows, Jr., and U.S. Pat. No. 1,495,934 issued May 27, 1924 to F. C. Thill. All of these structures, and similar structures, have incorporated various disadvantages, the most prominent of which is the inability of the parts to be adjusted to discrepencies in the disposition of the parts during the erection of the fence. In addition, once constructed, the fences are disposed in fixed designs; the fence sections which they incorporate cannot be changed readily, and such parts as are movable tend to become too flexible and fail to maintain the changed appearances which are designed for them. Further drawbacks include the difficulty of maintaining the finish on the exposed parts and the neat appearances which such fences presented when they were originally constructed.

The fence system of the present invention permits rapid construction of the fence, since the various elements are formed to anticipate a variety of disoriented dispositions of companion parts. Moreover, the components of the system are designed to be manufactured from steel and thereby lend a higher degree of strength to the fence construction than was heretofore feasible. The interchangeability of designs of portions of the new fence system permits greater flexibility in changing the overall appearance of a structure much more frequently than in prior constructions, and the finish on the surface of the parts which are incorporated in the new system requires much less maintenance or replacement than was heretofore economically feasible.

It is an object of this invention to provide a fence system incorporating in a fence section a fence rail readily adjustable in length to the distance between two adjacent fence posts.

It is another object of this invention to provide a fence system in which upper and lower fence rails between two adjacent fence posts provide channels along the length of the rails which permit individual panels of the fence section to be disposed between them in a fixed angular disposition to each other and the angularity of that disposition to be changed readily without disassembling the fence.

It is another object of this invention to provide a fence system in which the angularity of the disposition of the fence panels to each other may be fixed by a novel combination of a spindle extending from the rail into an anchor disposed in the panel.

It is another object of this invention to provide a fence section which includes a rail having an anchor portion telescopically and slidably mounted in the end of the rail.

It is another object of this invention to provide a fence section incorporating a rail portion having opposed sides forming a channel in which the ends of the fence panels are grasped.

It is another object of this invention to provide a fence system incorporating a fence panel having inner and outer face portions and edge portions which engage each other in a frictional manner and can readily be assembled at the site of the fence construction.

It is another object of this invention to provide a fence system incorporating an anchor joining a fence rail and an associated louver panel, and engaging the louver panel inside the edges of the panel.

It is another object of this invention to provide a fence system which incorporates an anchor for the fence panel which is pivotally mounted on the fence rail and frictionally engages the surface of the fence rail adjacent all four corners of the panel.

These and yet additional objects and features of the invention will become apparent from the following detailed discussion of the exemplary embodiments, and from the drawings and appended claims.

In a preferred form of the present invention, a fence section is disclosed which is adapted for disposition between adjacent fence posts. The section comprises an upper rail and a lower rail, each rail including rail portion including a base panel, substantially parallel side panels joined to the base panel at opposite edges of the base panel, web portions joined to the side portions and overlying the base panel, and flanges attached to the web portions, said flanges being disposed from the web portions spaced apart from and substantially parallel to the side panels and also being disposed in substantially parallel spaced apart relationship to the base panel whereby said web portions and flanges and the distal edge portions of the side panels form parallel channels overlying and spaced apart from the base panel. Each rail also includes an anchor portion telescopically and slidably mounted in an end of the rail portion, the anchor portion including an end web and side webs connected to a base web, said anchor portion side webs and said anchor portion base web being disposed adjacent the side panels and the base panel respectively of the rail portion. The fence section also includes a plurality of fence panels disposed intermediate the upper rail and the lower rail.

BRIEF DESCRIPTION OF THE DRAWINGS

For a complete understanding of this invention, reference should be made to the accompanying drawings in which:

FIG. 5 is an enlarged perspective view partially broken away of a modified form of a fragmentary portion of the fence section shown in FIG. 1, the modification being a parallel alignment of the faces of the louvers with the sides of the rails;

FIG. 6 is a cross-section view of one of the louvers shown in FIG. 5 along the line 6—6 in FIG. 5;

FIG. 7 is an enlarged view of the right-hand portion of FIG. 6;

FIG. 8 is a perspective view partially broken away of an alternative embodiment of the broken-away bottom portion of the louver panel shown in FIG. 5;

FIG. 10 is a perspective fragmented view partially broken away of a modified form of the middle fence rail shown in FIG. 5;

FIG. 11 is an elevational view of fragments of a modified form of the fence section and associated fence posts shown in FIG. 1;

FIG. 12 is a perspective view on an enlarged scale of a modified fragment of the fence section shown in FIG. 11 taken along line 12—12 in FIG. 11;

FIG. 13 is a perspective view on an enlarged scale of a fragment of the fence section shown in FIG. 11 taken along line 13—13 in FIG. 11;

FIG. 14 is a perspective view on an enlarged scale of a fragment of the fence section shown in FIG. 11 taken along line 14—14 in FIG. 11; and FIG. 15 is a perspective view on an enlarged scale of a fragment of the fence section shown in FIG. 11 taken along line 15—15 in FIG. 11.

DETAILED DESCRIPTION OF THE PREFERRED EMBODIMENT

Figure 1:
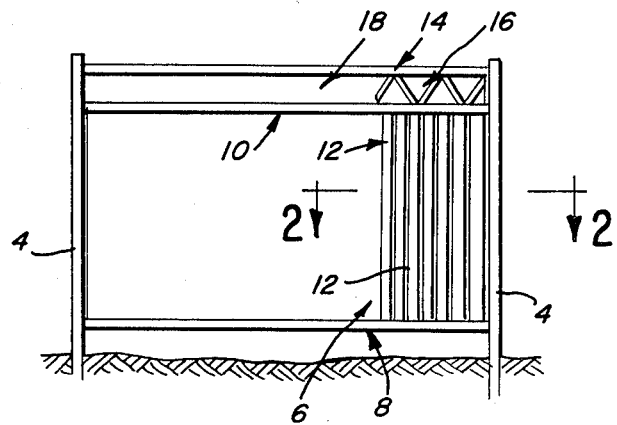
FIG. 1 is an elevational view of a partly constructed fence section disposed between adjacent fence posts.
Figure 2:
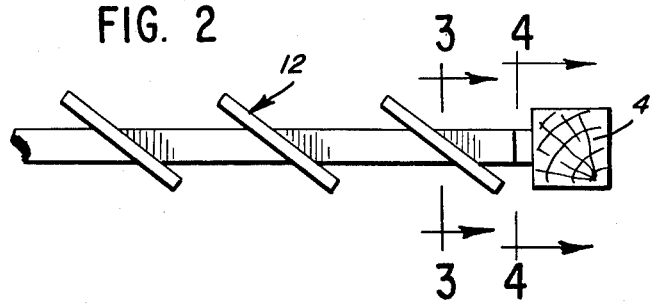
FIG. 2 is a cross-sectional view of a fragmentary portion of the fence section and one fence post shown in FIG. 1, taken along the line 2—2 in FIG. 1 on a larger scale.

Considering first the embodiment shown in FIGS. 1-9, adjacent fence posts 4 in a privacy fence line are illustrated having a fence section 6 extending between them. A lower fence rail 8 and an upper fence rail 10 are affixed to the posts 4. A plurality of fence panels 12 are affixed to the rails 8 and 10. The faces of the fence panels are disposed angularly to the longitudinal axes of the rails, as shown in FIG. 2. Each of the panels is affixed in this position by a means shortly to be discussed.

Although the fence section shown in FIG. 1 having the rail 10 as the upper rail is a very rigid structure, additional rigidity may be obtained by adding a top rail 14 which is anchored to posts 4. In between rail 14 and rail 10 a web 16 may be disposed, which may be of a decorative nature, the strength of the structure being supplied principally by the top rail 14 and the rail 10, as well as the lower rail 8. The formation of the rails 10 and 14 is such that, as shown in FIG. 1, the upper side of the rail 10 and the lower side of the rail 14 form channels, as will shortly be described, and the web 16 is clasped between the sides of the facing channels. Since the web 16 and the top rail 14 may be considered as a unit, that rail and the web form a closure member generally indicated by the arrow 18 for the top, open-channel side of the rail 10. In the construction illustrated in FIG. 1, utilizing the closure member 18, the rail 10 becomes an intermediate member between rails 14 and 8.

As more particularly shown in FIG. 5, the enlarged view of the fragmentary rail portion 8a of the lower fence rail 8 illustrates that the portion includes a base panel 20 and substantially parallel side panels 22 and 24. These side panels are joined to the base panel. At the distal edges of the side panels, web portions 26 and 28 are joined to the side panels and overlie the base panel 20. Flanges 30 and 32 are attached to the web portions and disposed from those web portions spaced apart from and substantially parallel to the side panels 24 and 22, respectively. The web portions are also disposed in substantially parallel spaced-apart relationship to the base panel so that the web portions, flanges and distal edge portions, which portions are shown at 34 in FIG. 5 and 36 in FIG. 4, of the side panels form parallel channels 38 and 40 overlying and spaced apart from the base panel.

An anchor portion 42 of the lower rail is telescopically and slidably mounted in the end of the rail portion 8a of the lower rail 8. The anchor 42 includes an end web 44 and side webs 46 and 48 connected to a base web 50. A fastener retaining means, such as the tabs 52 and 54 defining the U-shaped slot 56 in the end web 44 of the anchor, provides a means for engaging a fastener such as the threaded screw 58 in the anchor.

The rail portion 8a and the anchor portion 42 are constructed of a suitable gauge of steel to provide permanency and rigidity in the fence section. Also, the rail portion 8a is formed so that the distal edge portions 34 and 36 of the side panels 22 and 24 are disposed closer together than the junctions of the side panels with the rail base panel 20. This configuration and the preferably unitary structure of the side panels and base panel utilize the strength of the steel in clamping the anchor portion 42 of the rail between the side panels 22 and 24. The clamping engagement of the anchor portion is shown in FIG. 4 wherein the side webs 46 and 48 of the anchor portion are disposed adjacent the side panels 22 and 24, respectively, of the rail portion, and the base web 50 of the anchor portion is disposed adjacent the base panel 20 of the rail, intermediate the base panel and the web portions 26 and 28 of the rail.

Figure 4:
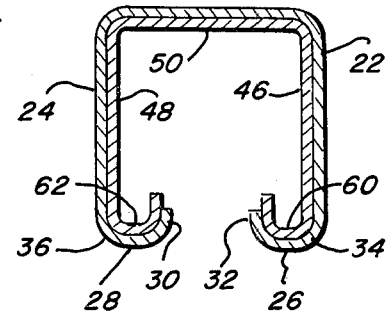
FIG. 4 is a cross-sectional view taken along line 4—4 in FIG. 2.

In the preferred form of the anchor and rail portion engagement which is shown in FIG. 5, and in cross-section in FIG. 4, the telescopic and slidable mounting of the anchor in an end of the rail portion is facilitated by providing runner portions 60 and 62 at the distal edges of the side webs 46 and 48, respectively, of the anchor portion. The runners 60 and 62 are disposed within the parallel channels 38 and 40 of the rail portion so that the runner 60, for example, is normally in contact with substantial surface areas of the distal edge portion 34 of the rail side panel 22, the web portion 26 and the flange 32.

The telescopic and slidable engagement of the anchor portion 42 with the rail portion 8a provides a construction of a fence rail such as 8, and like rails 10 and 14, which is readily adjustable in length to accommodate slight variations in width between posts 4. Such variations are almost always encountered after the posts are installed. The length of the anchor portion of the rail is such that the threaded screw 58 may be tightened into one of the posts 4 to securely and with great strength engage the end of the anchor portion 42 on the face of the post while still maintaining permanent, secure engagement of the anchor portion with the rail portion.

Moreover, due to the channel-like formation of the anchor portion, and the open-sided configuration of the rail portion, ready access to the threaded screw 58 can be maintained for future adjustment over the period of time in which the fence section is in place. This construction also conceals the threaded screw 58 from view when the fence section is attached to a post, which enhances the decorative appearance of the fully constructed fence.

The novel construction of the fence panels 12 adds further strength, rigidity, and permanence to the structure and aesthetic appearance of the fence system. The panels 12 are shown in detail in FIGS. 5 through 7. Each panel includes an outer louver portion 64 and an inner louver portion 66. The outer louver portion includes a face portion 68, edge portions 70 and 72 oppositely disposed to each other along the sides of the face portion and web portions 74 and 76 at the distal edges of the edge portions, which web portions overlie and are spaced apart from the face portion 68. Flange portions 78 and 80 extend along the web portions substantially parallel to and spaced apart from the outer louver edge portions, 70 and 72, respectively. As shown in FIG. 6, the flange portions 78 and 80 are substantially normal to the web portions 76 and 74, respectively.

The inner louver portion 66 of one of the panels 12 includes a face portion 82 and edge portions 84 and 86 oppositely disposed to each other along the sides of the inner louver face portion 82. The inner louver face portion 82 is disposed against the web portions 74 and 76 of the outer louver panel portion 64, and the inner louver edge portions 84 and 86 are disposed against the edge portions 70 and 72, respectively, of the outer louver portion 64. As shown more particularly in enlarged detail in FIG. 7, the inner louver portion 66 of the panel 12 also includes flange portions such as are shown at 88 and 90 joined to and extending along the inner louver edge portions 84 and 86, respectively. The flange portions 88 and 90 are spaced apart from the inner louver face portion 82, and engage, as will shortly be described, the side portions of the outer louver portion face 68.

Preferably the inner louver portion 66 and the outer louver portion 64 of the panel 12 are formed of sheet steel stock which can be given long-lasting weatherproof coatings to maintain the decorative appearance of the fence panel. The configuration of the inner and outer louver portions just described can readily be formed in such stock. Also, the inner and outer louver portions may be easily transported to the site of a fence location and assembled on the site.

When the louver portions are fitted together, they provide a rigid box section fence panel of exceptional strength. The inner louver edge portions 84 and 86 are frictionally engaged upon the outer louver edge portions 70 and 72, respectively, by pressure exerted by the inner louver face portion 82. The frictional engagement is maintained by constructing the inner louver portion so that the inner louver face portion 82 is integrally joined to the inner louver edge portions 84 and 86, and the resilient bias of that integral union urges the inner louver edge portions 84 and 86 constantly against the outer louver edge portions 70 and 72. In a slight modification of this construction, to enhance the frictional engagement of the inner and outer louver edge portion, the inner louver face portion 82 may be of greater width between the inner louver edge portions 84 and 86, including outwardly extending protrusions thereon which will shortly be described, than the width of the outer louver face portion 68. Thus, when the inner and outer louver portions are assembled, the inner louver snaps into place and remains so under compression in nestably engaging the outer louver portion 64. The frictional engagement is maintained by the inner louver face portion 82 being slightly wider than the width of the outer louver portion between the outer louver edge portions 70 and 72.

The integral connection of one of the inner louver edge portions with the inner louver face portion is shown in detail in FIG. 7. A yoke 92 is formed in the opposed edges of the inner louver face portion 82 and inner louver edge portion 84. A second yoke 94 is formed in the opposed edges of the inner louver edge portion 84 and inner louver flange portion 88. The bight of the first yoke 92 is disposed against the outer louver web portion 76 overlying the outer louver face portion 68, and the bight of the second yoke 94 is disposed against the outer louver edge portion 70 and the outer louver face portion 68. Thus, the outer louver portion of the panel is securely engaged on the inner louver portion of the panel about the yokes 92 and 94 formed in the face and edge portions of the inner louver portion 82. An additional point of engagement may also be provided, as shown in FIG. 7, by forming a valley 96, or other like indentation, in the face portion 82 of the inner louver. The flange 78 attached to the web portion 76 of outer louver panel portion 68 is engaged in the valley 96 so that when the inner louver portion and outer louver portion of the panel are snapped together during assembly, the yokes 92 and 94 are positively positioned against the web 76, edge 70 and face portion 68 of the outer louver panel portion 64.

Each of the fence panels 12, constructed in the manner just described, is adapted to be supported between the upper rail 10 and the lower 8 of the fence section generally depicted in FIG. 1. A novel anchor for each of the fence panels is provided, and is shown in FIG. 5 at the general numeral 98. The anchor 98 includes a base panel 100 and mirror image side panels 102 and 104 (see FIG. 3), thus forming a channel 106 between the side panels and the face panel. Fence panel engagement portions 108 and 110 of the anchor side panels and base panel are disposed adjacent each end of the channel 106. In the illustrated embodiment in FIG. 5, the base panel 100 and the side panels 102 and 104 are receivable in the end of face panel 12 inside the outer surfaces of face portion 82 and 68 and edge portions 84 and 86, the dimension taken from the outer surface of the anchor side portion 102 to the outer surface of anchor side portion 104 substantially perpendicular to the longitudinal axis of channel 106 being less than the thickness of the fence panel 12. In the assembly shown in FIG. 5, a portion of the edge of the inner louver fence panel 66 is provided with a locking engagement means such as slot 112, and the engagement portion 108 of the panel anchor 98 is receivable in the slot, thus forming a locking engagement between the anchor 98 and the edge portion of the panel 12. A like locking engagement means 114 is provided in edge portion 86 of the inner louver panel 66 so that engagement portion 110 of the anchor 98 is receivable in locking engagement in the other edge portion of the fence panel.

Figure 3:
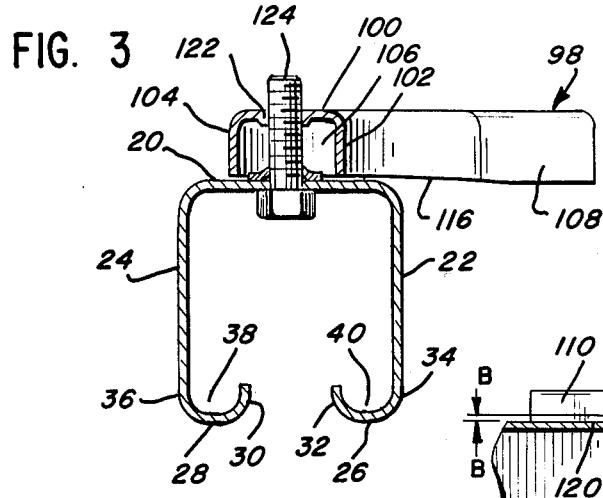
FIG. 3 is a cross-sectional view partially in perspective taken along line 3—3 in FIG. 2, on an enlarged scale, of the fence rail and a portion of a louver anchor disposed at the bottom of the angled louver panel at the line 3—3 in FIG. 2.
Figure 9:
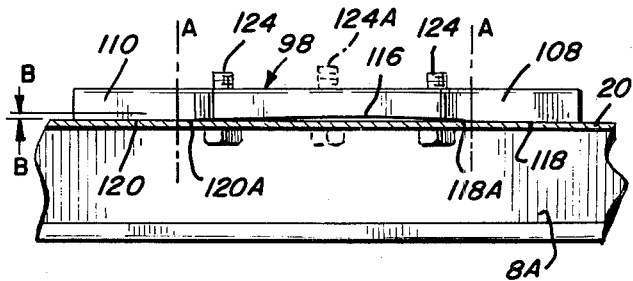
FIG. 9 is a cross-sectional view in elevation of the portion of FIG. 5 taken at line 9—9 with an alternative fastener shown in phantom.

In the particular embodiment shown in FIGS. 3, 5 and 9 the portions of the anchor side panels 102 and 104 which form the locking engagement portion 108 and 110 are adapted to be disposed inside the inner and outer louver fence panel portions 66 and 64, and accordingly the side panels 102 and 104 of the anchor 98 in the engagement portion 108 and 110 are parallel to each other and spaced apart by a lesser dimension, taken substantially perpendicularly to the longitudinal axis of channel 106, than the portions of the side panels 102 and 104 intermediate the fence panel engagement portions. Furthermore, in disposing the anchor 98 invisibly in the end portions of panels 12, the side panels 102 and 104 of the anchor 98 intermediate the locking engagement portions 108 and 110 have a dimension such that the width of the anchor 98 spaces apart the face portions 62 and 68 of the fence panel in which the anchor 98 is receivable. The dimension intermediate the locking engagement portions 108 and 110 is taken from one side panel surface outside of the channel 106, substantially perpendicularly to the longitudinal axis of that channel, to the surface of the other side panel outside of the channel.

In practice it has been found desirable to provide the anchor 98 with fence rail engagement portions, or feet, which frictionally engage the base panel, such as 20, of a fence rail (see FIG. 5). The distal edges of the side panels 102 and 104 of the anchor 98 are therefore not in the same horizontal plane; that is, the side panels 102 and 104 and the base panel 100 of the anchor 98 provide a channel 106 having greater depth adjacent the fence panel engagement portions 108 and 110 than the depth of the channel intermediate those engagement portions. The lesser depth of the channel intermediate the fence panel engagement portions is achieved by providing the distal edge portions of the side panel with a slightly arcuate form 116 indicated by the dimension arrows B—B in FIG. 9. Thus, the side panels 102 and 104 of the anchor 98 include feet 118 and 120 (see FIG. 9) as fence rail engagement portions adjacent each of the fence panel engagement portions 108 and 110.

The fence panels may be made in various widths, but the configuration of the distal edges of the side panels 102 and 104 of anchor 98 just described is adaptable to various manufacturing practices. When the anchor is to be used with relatively narrow-faced fence panels, the length of the panel engagement portions 108 and 110 may be reduced to the dimension illustrated by the dotted lines AA in FIG. 9, as by shearing substantially but not all of the entire length of the portions 108 and 110 from the body of anchor 98. Thus, fence rail engagement portions, or feet, as shown at 118A and 120A, are retained.

The adjacent ends of the inner and outer louver face portions and edge portions of panel 12 above described define a socket bounded by those face and edge portions, in which socket the anchor 98 is disposed. The substantially parallel side portions 102 and 104 and the base portion 100 of the anchor define the channel 106 within the anchor, and the said channel when the anchor is disposed in the socket accordingly extends along the inner and outer louver face portions 82 and 68 between the louver edge portions 84 and 86. Preferably, the inner and outer louver portions of the panel 12 do not completely enclose the anchor but instead leave the rail engagement feet 118 and 120 exposed below the end of the panel. Thus, the inner and outer louver face portions 68 and 82 partially overlie the louver anchor parallel side portions 102 and 104 while the base panel 100 of anchor 98 is wholly disposed within the socket. The feet 118 and 120 adjacent the ends of channel 106 extend outwardly from the socket. In practice, these feet are coated with a tough, wear-resistant but non-abrasive paint which enhances the frictional engagement of the anchor on the rail but avoids marring the surface of the rail whenever the panel is relocated or pivoted. Moreover, the distance which the feet extend outwardly from the socket is so minute that when the fence section is constructed, the junction of the panel faces and the rail does not present any apparent gap.

Alternatives for fixedly or pivotally mounting the anchor 98 on the rail portion 8a are illustrated in FIGS. 3, 5 and 8, and in phantom in FIG. 9. Looking particularly at FIGS. 3 and 5, a means for fastening the anchor to the fence rail is disposed in the base panel 100 of the anchor. Such means may simply be a tapped aperture 122, as shown, or a nut (not shown), into which a bolt 124 or other spindle is threaded and tightened. The bolt extends from the base panel 20 of the lower rail through the fastening means 122 on the anchor, thereby concealing the fastener completely when the panel is assembled on the anchor, but nevertheless making the fastener readily accessible after construction has been completed. As illustrated particularly in FIG. 5, a plurality of spindles or bolts 124 may be used when it is desired to make the disposition of the panel on the rail relatively permanent. However, after construction is completed, with the fence panels in a fixed position, it is not necessary to disassemble the entire fence section in order to change the attitude of one or more panels. A single bolt 124a, as shown in phantom in FIG. 9, may be substituted for the bolts 124 as a pivot for the fence panel. The fence panels are affixed to upper and lower rails by affixing the louver anchors at each end of each fence panel, and since the side panels of each rail forming the rail channel extend away from the fence panel, the open side of each rail channel permits ready access to the fastener means such as bolts 124.

The fence system of the present invention, embodying the novel forms of fence rail, louver panel and panel anchor described above, permits a large number of variations within the basic system construction. For example, when the upper rail 10, formed in the same manner as lower rail 8, is adopted, ready access to the fastener means is permitted through the open side of the channel formed by side panels 22a and 24a and base panel 20a (see FIG. 10). Also, it is an important aspect of the preferred embodiments of the invention that the rails be formed throughout their lengths with the distal edges of the side panels disposed closer together than the junctions of the side panels with the rail base portion. Such configuration permits the wedging of closure members in the open side of the rail channel without the need of nails, bolts or other such fasteners and eliminates difficulties attendant upon the deterioration of materials adjacent the points pierced by such fasteners.

For example, decorative channel closure member 126, also shown in FIG. 10, which is also functional with respect to keeping debris such as leaves, twigs and other foreign objects out of the channel, may be wedged between the side panels of the second rail 10 in contact with the second rail flanges 30a and 32a. These flanges are attached to web portions such as shown at 26a which, in turn, are connected to the side panels 22a and 24a of the second fence rail 10. The web portions like 26 and 28 of the lower fence rail overlie and are disposed in substantially parallel spaced-apart relationship to the base panel 20a of the second fence rail.

An alternative form of channel closure member 126 is illustrated at 18 in FIG. 5 and FIG. 1, wedged at one edge 128 between the side panels 22a and 24a of rail 10. Rail 14 is inverted with respect to rail 10 in order that a second edge 130 of channel closure member 18 may be wedged between the side panels of rail 14. As heretofore described, top rail 14 is provided with an anchor portion like anchor portion 42 in the lower rail 8 for affixing rail 14 to an adjacent fence post. When a three-rail fence section such as shown in FIG. 5 is constructed, rail 10 becomes an intermediate upper rail between rails 8 and 14.

Minor modifications of the fence system disclosed herein may be utilized to provide the alternative embodiment illustrated in FIGS. 11-15 in which the construction of the rails to provide the clamping action between the rail flanges and eliminate transverse fastening members such as bolts or nails is quite desirable. As shown in FIGS. 11 and 13, the same form of adjustable fence rail is utilized in the alternative embodiment as is utilized in the principal embodiment illustrated especially at FIG. 5. Thus, each of the rails 132, 134 and 136 are identical to the rails 14, 10 and 8, and the anchor portion 138, although shown in an inverted position in FIG. 13, is identical to anchor portion 42 in FIG. 5. As shown in FIG. 11, a plurality of fence panels 140 are disposed intermediate the upper, intermediate rail 134 and the lower rail 136, engaged upon and extending from the said upper rail to the lower rail. The side panels of upper rail 134 are disposed in a downwardly direction and the side panels of lower rail 136 are disposed in an upwardly direction, thereby permitting the plurality of fence panels 140 to be engaged at one end between flanges of the upper rail and at the other end between flanges of the lower rail. The lower rail 136 is partially illustrated in an enlarged fragment in FIG. 15 showing the lower ends of panels 140 engaged between the flanges 142 and 144. The engagement of panels 140 on rail 134 is identical to the engagement of the panels 140 on the rail 136.

In the alternative embodiment of FIG. 11, a vertically disposed beam 146 connects upper rail 134 to lower rail 136. When desired, the beam 146 may be formed of wood to complement the texture of panels 140, which may also be formed of wood. Shoulders 148 and 150 are formed at one end of beam 146, and a tongue 152 is extended outwardly from the shoulders. As most clearly seen in FIG. 15, the shoulders 148 and 150 are disposed upon the web portions 154 and 156 of lower beam 136. The tongue 152 extends from between the shoulders 148 and 150 and is disposed between the flanges 142 and 144 of lower rail 136. A like construction is formed at the upper end of beam 146 whereby the beam and rail 134 are engaged in the manner illustrated and described with respect to FIG. 15. The edges of beam 146 are provided with channel sections 158 and 160, thereby permitting a second plurality of the fence panels, such as the fence panel 162 to be disposed at one end between the flanges of one of the rails and at the other end in the channel section 158 on the beam 146.

A second beam 162a, a vertical half of beam 146, may also be provided, when it is desired to dispose the panels 140 acutely to the rails 134 and 136, extending from the upper rail 134 to the lower rail 136. A channel section 164 is provided in the side of beam 162a, and the end of a fence panel, such as 166, may then be disposed in the channel of section 164. The second beam 162a may, if desired, be fastened as by screw 168 to a post 4a, although such fastening means is not ordinarily required due to the formation of tongues similar to tongue 152 at the ends of beam 162a and the wedging of the tongues on the second beam between the flanges of rails 136 and 134. Thus, a third plurality of fence panels, such as panel 166 and similarly disposed panels, are disposed at one end between the flanges of one rail 136 and at the other end in the channel section 164 of the second beam 162a.

Another alternative modification of the fence system disclosed herein is illustrated in FIG. 12, wherein a decorative web is disposed above a plurality of panels in the fence section. A horizontal beam 170, similar to the form of beam 146, extends between a pair of vertical beams similar to beam 162a. Tongue portions are provided on horizontal beam 170 which engage channel sections identical to channel 164 on beam 162a. Horizontal channel sections 172 and 174 are formed on opposite sides of beam 170. As illustrated in FIG. 12, a plurality of fence panels 140a is disposed at one end in the first channel section 174 on one side of beam 170 and a closure member 176 is disposed in the second channel section 172 on the side of the beam opposite to the first channel section 174. The beam 170, in the modification shown in FIG. 12, is located intermediate and substantially parallel to an upper rail 178 and a lower rail (not shown) identical to rail 178. Thus, the fence section, a fragmentary portion of which is shown in FIG. 12, includes a beam 170 which is intermediate and substantially parallel to the upper rail 178 and the lower rail, a plurality of panels 140a disposed at one end in the first channel section 174 on one side of beam 170, and a closure member 176 having one edge disposed in the second channel section 172. The closure member is located on the side of beam 170 opposite to the first channel section 174 and has a second side disposed between the flanges 180 and 182 of the upper rail 178.

An alternative fence rail engagement means for the anchor 98, instead of the fence rail engagement feet discussed above, is illustrated in FIG. 8. A collar 184 is disposed upon bolt or spindle 124A inside the anchor 98a. The collar includes a body portion 184a engaging the louver anchor base panel 100a and the louver anchor side panels such as shown at 102a. The collar 184 may also include a flange portion 184b, as shown in FIG. 8, extending outwardly from one end of the collar body portion 184a. The flange portion of the collar 184b is disposed intermediate the distal edges of the side portions of the anchor 98a and the base panel 20b of a fence rail. Such intermediate disposition, particularly when the collar is made of a soft plastic material, provides a pad on which the anchor 98a may be tightened onto the base panel 20b of a fence rail without actually contacting it. When a relatively strong degree of pressure is applied on the anchor 98a, as by tightening bolt 124A, the anchor is held in a fixed attitude with respect to the fence rail, but with a lighter degree of pressure, the anchor is pivotable about the bolt 124A on the base web 20b of the fence rail without marring the surface of the rail.

While particular embodiments of the present invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which come within the true spirit and scope of the invention.

What is claimed is:

1. A fence section adapted for disposition between adjacent fence posts comprising an upper rail and a lower rail, each rail including
- a rail portion including a base panel, substantially parallel side panels joined to the base panel at opposite edges of the base panel, web portions joined to the side panels and overlying the base panel, and flanges attached to the web portions, said flanges being disposed from the web portions spaced apart from and substantially parallel to the side panels and also being disposed in substantially parallel spaced apart relationship to the base panel whereby said web portions and flanges and the distal edge portions of the side panels form parallel channels overlying and spaced apart from the base panel,
- an anchor portion telescopically and slidably mounted in an end of the rail portion, said anchor portion including an end web and side webs connected to a base web, said anchor portion side webs and said anchor portion base web being disposed adjacent the side panels and the base panel respectively of the rail portion,
- a plurality of fence panels disposed intermediate the upper rail and the lower rail,
- the plurality of fence panels being engaged on and extending from the upper rail to the lower rail, and
- the upper rail being connected to the lower rail by a beam which includes shoulders at each end abutting the webs of the upper and lower rails and a tongue at each end extending from between the shoulders and disposed between the flanges of the rails.

2. The fence section of claim 1 in which the beam connecting the upper and lower rails includes a channel section on one side of the beam, and a second plurality of fence panels disposed at one end between the flanges of one of the rails and at the other end in the channel section on the beam.

3. The fence section of claim 2 which includes a second beam extending from the upper rail to the lower rail and having a channel section on at least one side, and a third plurality of fence panels disposed at one end between the flanges of one of the rails and at the other end in the channel section on the second beam.

4. A fence section adapted for disposition between adjacent fence posts comprising an upper rail and a lower rail, each rail including
- a rail portion including a base panel, substantially parallel side panels joined to the base panel at opposite edges of the base panel, web portions joined to the side panels and overlying the base panel, and flanges attached to the web portions, said flanges being disposed from the web portions spaced apart from and substantially parallel to the side panels and also being disposed in substantially parallel spaced apart relationship to the base panel whereby said web portions and flanges and the distal edge portions of the side panels form parallel channels overlying and spaced apart from the base panel,
- an anchor portion telescopically and slidably mounted in an end of the rail portion, said anchor portion including an end web and side webs connected to a base web, said anchor portion side webs and said anchor portion base web being disposed adjacent the side panels and the base panel respectively of the rail portion,
- a plurality of fence panels disposed intermediate the upper rail and the lower rail,
- a beam intermediate and substantially parallel to the upper rail and the lower rail, the plurality of fence panels being disposed at one end in a first channel section on one side of the intermediate beam, and
- a closure member disposed in a second channel section on said beam opposite to said first channel section.

5. The fence section of claim 4 in which one side of the closure member is disposed in the second channel section and a second side of the closure member is disposed between the flanges of the upper rail.

6. An adjustable fence rail for joining adjacent fence posts to each other and supporting a fence panel between the posts comprising,
- a rail portion including a base panel, substantially parallel side panels joined to the base panel at opposite edges of the base panel, web portions joined to the side panels and overlying the base panel, and flanges attached to the web portions, said flanges being disposed from the web portions spaced apart from and substantially parallel to the side panels and also being disposed in substantially parallel spaced apart relationship to the base panel whereby said web portions and flanges and the distal edge portions of the side panels form parallel channels overlying and spaced apart from the base panel, and
- an anchor portion telescopically and slidably mounted in an end of the rail portion, said anchor portion including an end web and side webs connected to a base web, said anchor portion side webs and said anchor portion base web being disposed adjacent the side panels and the base panel respectively of the rail portion,
- the side panels of the rail portion being disposed closer together adjacent their distal edges that an their edge portions adjacent to the base panel whereby the side webs of the anchor portion are frictionally engaged by the side panels of the rail portion adjacent said distal edges.

* * * * *